United States Patent
Xin et al.

(10) Patent No.: US 12,403,934 B2
(45) Date of Patent: Sep. 2, 2025

(54) VEHICLE OPERATION CONTROL SYSTEM FOR A DYNAMIC AND TRANSFORMATIVE VEHICLE SYSTEM

(71) Applicants: Alfred X. Xin, Cincinnati, OH (US); Christopher Murphy, Cincinnati, OH (US); Sherry Sun, Cincinnati, OH (US)

(72) Inventors: Alfred X. Xin, Cincinnati, OH (US); Christopher Murphy, Cincinnati, OH (US); Sherry Sun, Cincinnati, OH (US)

( * ) Notice: Subject to any disclaimer, the term of this patent is extended or adjusted under 35 U.S.C. 154(b) by 77 days.

(21) Appl. No.: 18/387,023

(22) Filed: Nov. 4, 2023

(65) Prior Publication Data

US 2025/0145172 A1    May 8, 2025

(51) Int. Cl.
*B62D 63/02* (2006.01)
*B60W 40/06* (2012.01)
*B60W 50/14* (2020.01)
*B60W 60/00* (2020.01)

(52) U.S. Cl.
CPC .......... *B60W 60/001* (2020.02); *B60W 40/06* (2013.01); *B60W 50/14* (2013.01); *B60W 2050/146* (2013.01); *B60W 2420/403* (2013.01)

(58) Field of Classification Search
CPC .. B62D 63/025; B62D 21/12; B62D 25/2018; B62D 25/2027
See application file for complete search history.

(56) References Cited

U.S. PATENT DOCUMENTS

| | | | |
|---|---|---|---|
| 11,691,673 B1 * | 7/2023 | Zhao | B62D 3/02 180/233 |
| 2013/0241236 A1 * | 9/2013 | Vitale | B62D 47/003 296/193.04 |
| 2020/0369334 A1 * | 11/2020 | Lee | B60K 1/04 |
| 2022/0355636 A1 * | 11/2022 | Harmon | B62D 63/025 |

* cited by examiner

*Primary Examiner* — Kenneth J Malkowski

(57) ABSTRACT

A dynamic and transformative vehicle system (DTVS) consists of a driving module and different types of non-driving vehicle modules. When given a command via a wired or wireless control device the vehicle modules shall be automatically configured into one vehicle with a minimum of two axles or detached back to individual vehicle module. Once coupling and configuration process is completed, a vehicle operational control system of the dynamic and transformative system in the driving module is programmed to dynamically activate all the vehicle control and interactive user interface, operational and safety functions configured for specific module types and models coupled and configured.

14 Claims, 3 Drawing Sheets

VEHICLE OPERATION CONTROL SYSTEM FOR A DYNAMIC AND TRANSFORMATIVE VEHICLE SYSTEM

FIELD OF THE INVENTION

The present invention relates to modular electric vehicles, more particularly but not by way of limitation, a Dynamic and Transformative Vehicle System (DTVS), which provides vehicle modules with a plurality of capacities and functions and may be actively coupled and configured into different types of vehicles based on demands.

BACKGROUND

The dynamic and transformative vehicle system (DTVS) consists of a driving module and different types of non-driving vehicle modules. When given a command via a wired or wireless control device, the vehicle modules shall be automatically configured into one vehicle with minimum two axles, or detached back to individual vehicle module. Once coupling and configuration process is completed, a vehicle control system must be able to handle vehicle operational requirements designed and configured for the dynamically coupled and configured vehicles, varying in size, weight, capacities, and functions.

SUMMARY OF THE INVENTION

An object of the dynamic vehicle control system is to check if the locking mechanism installed on the driving module is securely locked into position and locked up the longitudinal couplers and vehicle body couplers of the modules.

Another object of the dynamic vehicle control system is to check, and initiating autopilot and full self-driving (FSD) functions configured for the model of the non-driving module coupled to the model of the driving module.

Still another object of the dynamic vehicle control system is to activate the vehicle operation commands center configured with instrument with touchscreen dashboard wherein the digital dashboard interactively displays vehicle operation related graphic user interface (GUI) and functions designed for the model of the non-driving module coupled to the model of the driving module.

An object of the dynamic vehicle control system vehicle command center with interactive digital console screen is configured to process and display information and images of vehicles coupled and configured with different vehicle modules varying in functions and capacities and models in plurality of data formats.

Another object of the dynamic vehicle control system is to check if the braking systems on the driving and non-driving modules are synchronized for distributing the braking power setup for specific modules coupled.

Yet, another object of the dynamic vehicle control system is to activate the independent suspension system's response commands and procedures for the specific model and type of the non-driving and driving modules coupled vehicle in response to road conditions.

Another object of the dynamic vehicle control system is to adjust the chassis to ground clearance height for a specific type of coupling for vehicle required for operation.

Still another object of the dynamic vehicle control system is to activate and adjusting the sensor and or camera configured with security systems for the particular modules coupled vehicle.

An object of the dynamic vehicle control system is to adjust the vehicle signal system for the particular modules coupled vehicle.

Still, another object of the dynamic vehicle control system is to activate or adjust sensor and or camera system for monitoring road and surrounding conditions for the particular modules coupled vehicle.

Yet, another object of the dynamic vehicle control system is to consolidate vehicle modules' electric systems into one system and supply electrical power to the entire vehicle.

Another object of the dynamic vehicle control system is to synchronize electric power supply resources on both driving and non-driving modules for powering the motors configured to each wheel on the driving and non-driving modules, and other electric equipment.

Again, an object of dynamic vehicle control system is to adjust visual and audio monitoring systems, such as mirrors, video and or camera monitoring systems for the models of the vehicle modules coupled vehicle.

Another object of the dynamic vehicle control system is to have a digital license plate system integrated with the vehicle control system and displaying vehicle licenses for head and tail of the vehicle modules.

Still, another object of the dynamic vehicle control system is to activate an anti-hacking software system securely configured with the vehicle control system, preventing malicious attempts and threats from taking over controls of the vehicle control system and the Automated Coupling and Configuration System (ACCS).

To the accomplishment of the above and related objects of the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by referencing to the following detailed description and appended claims when taken in conjunction with the accompanying drawings wherein:

DETAILED DESCRIPTION

Figure 1:
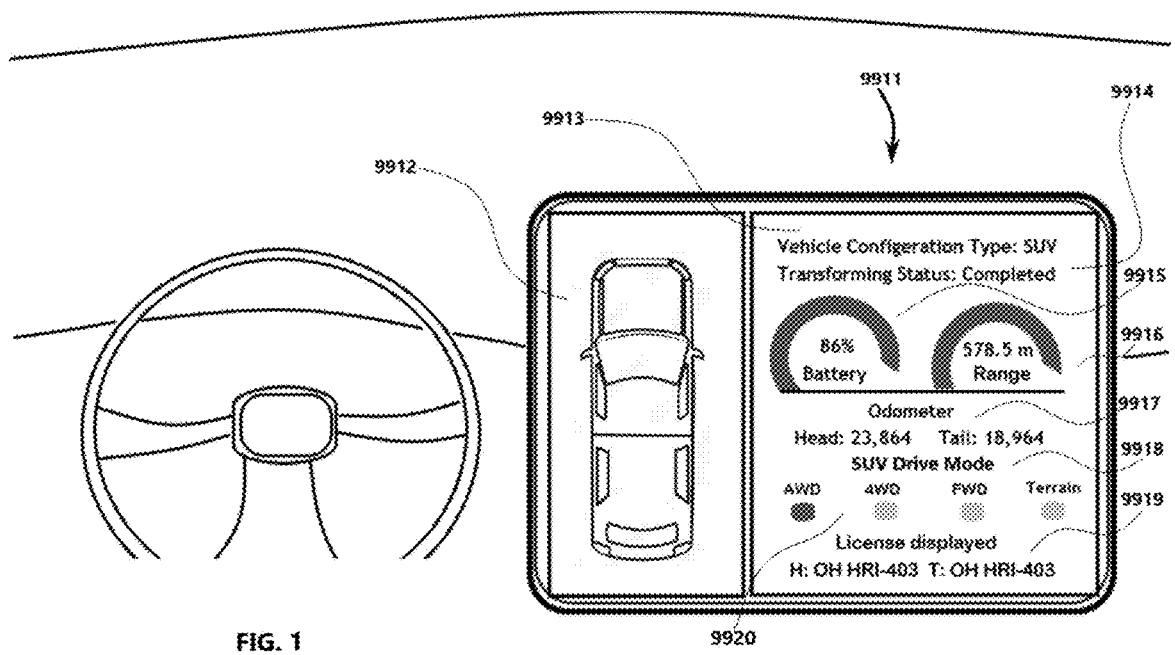
FIG. 1 illustrates an interactive vehicle digital dashboard of SUV.

In the following text, the terms "a Dynamic and Transformative Vehicle System", "DTVS", "vehicle operation controller". "A vehicle operation control system for a dynamic and transformative vehicle system", "vehicle module", "modular electric vehicle system", "attached vehicle modules", "driving module", "head", "non-driving module", "tail", "trailer module", "trailer vehicle", "detached vehicle module", "configured vehicle", "sub-coupling system", "a plurality of couplers", "coupling and configuration control system", "coupling and configuration controller", "automated vehicle coupling and configuration system", "coupling and configuration", "decoupling and deconfiguration", "vehicle operation and control system", "vehicle operation controller" etc. may be used interchangeably and may refer to any of a variety of different terms, the coupling system and configuration procedures; vehicle de-coupling procedures, control systems, electric controller, vehicle operation controller, vehicle operation control system and other components defining the invention.

The entire coupling and decoupling and configuration process is initiated by vehicle users via a wireless control device and completed with an automated coupling and configuration system (ACCS) without manual intervention. After the coupling and configuration process is completed, the coupled vehicle modules, a driving module and a non-driving module will have a minimum of two axles.

A vehicle operational control system of the dynamic and transformative system in the driving module is programmed to dynamically activate all the vehicle operational control and safety functions configured for specific module types and models coupled and configured.

When the coupling and configuration process is completed, the ACCS controller on the driving module sends a signal and information of the coupling and configuration status and information of the non-driving module coupled to the driving module to the operation control system on the driving module. The vehicle operation control system receives the signal and information indicating if the coupling and configuration procedures are completed successfully.

If the coupling and configuration process is completed successfully, the vehicle control system then first verifies if all the components of the vehicle modules, software, hardware, electric and electronic components, are properly connected, configured and functional, and then the vehicle control system takes over the controls of the vehicle, and locks up the ACCS operational functions and prevents the ACCS from taking any further actions which may result in separation of the driving and non-driving module during vehicle operation.

The vehicle operation and control system in the driving module verifies the type of the non-driving module configured with the driving module, and then initiates vehicle control system configured for the specific type of modules configured: hardware and software, sensors and or cameras configured with vehicle safety and operation system and control system, and activates vehicle operational functions and feels of vehicle cabin configured for the specific type of vehicles and models, and or user selected feels of the driving environment and vehicle functional responses. These hardware and software configurations and functions including, but not limited to:

a. checking if the manual locking mechanism installed on the driving module is put into action and locked up the longitudinal couplers of the modules.
b. initiating autopilot and full self-driving (FSD) functions configured for the model of the non-driving module coupled to the model of the driving module.
c. initiating the vehicle operation commands center configured with instrument with touchscreen dashboard wherein the digital dashboard interactively displays vehicle operation related graphic user interface (GUI) and functions designed for the model of the non-driving module coupled to the model of the driving module.

Figure 2:
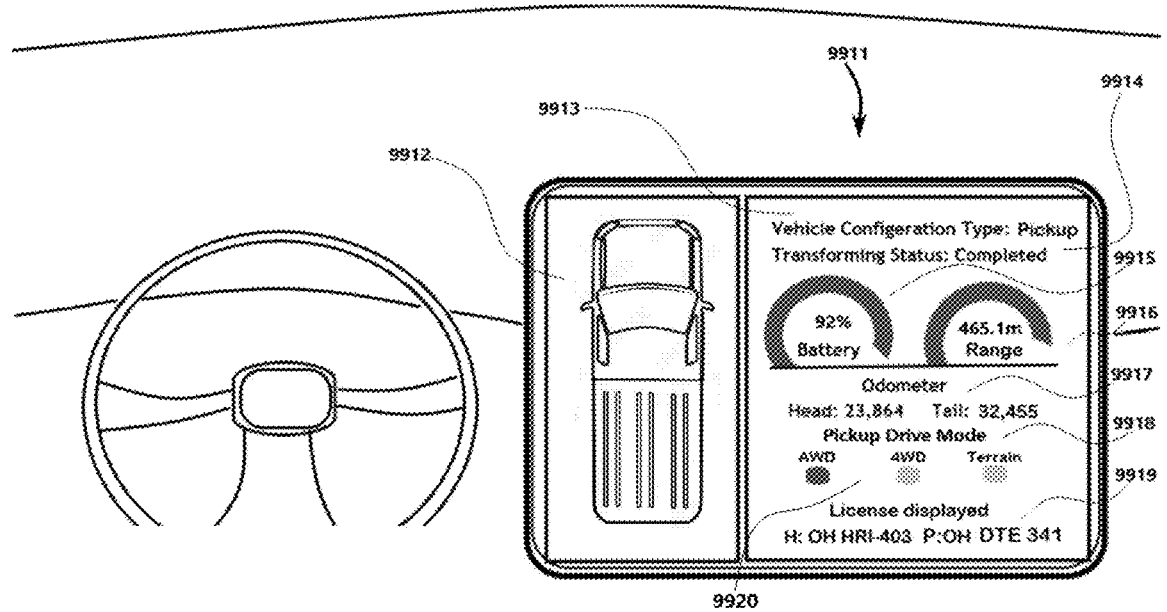
FIG. 2 illustrates an interactive vehicle digital dashboard of a pickup truck.
Figure 3:
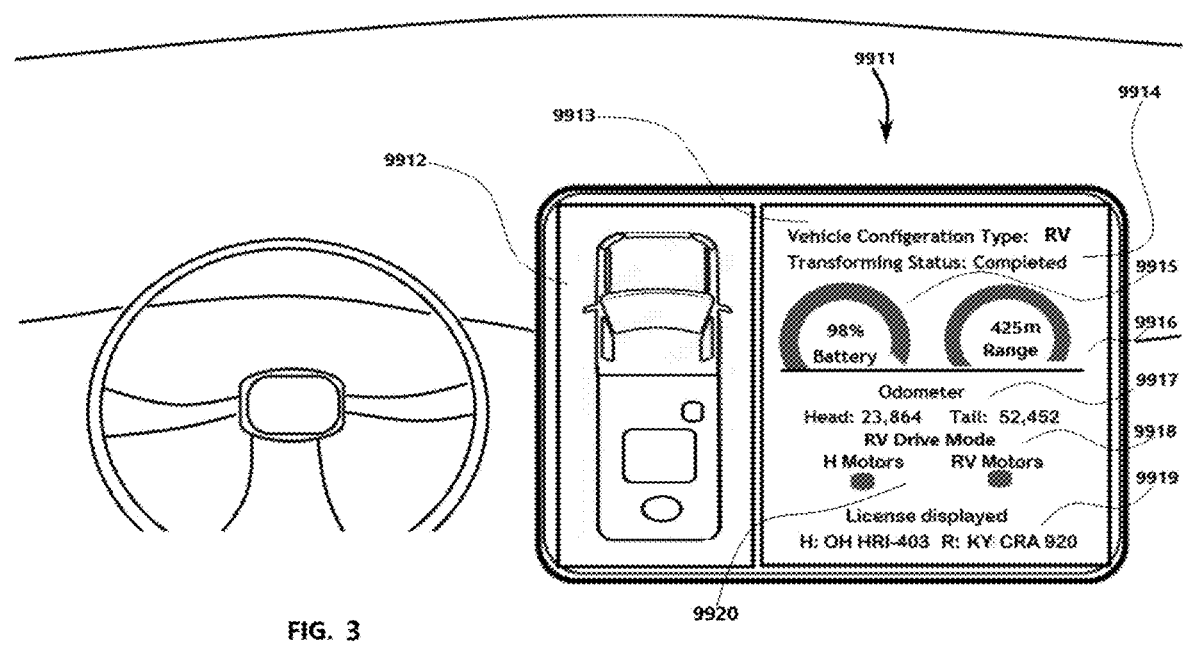
FIG. 3 illustrates an interactive vehicle digital dashboard of a recreational vehicle.
Figure 4:
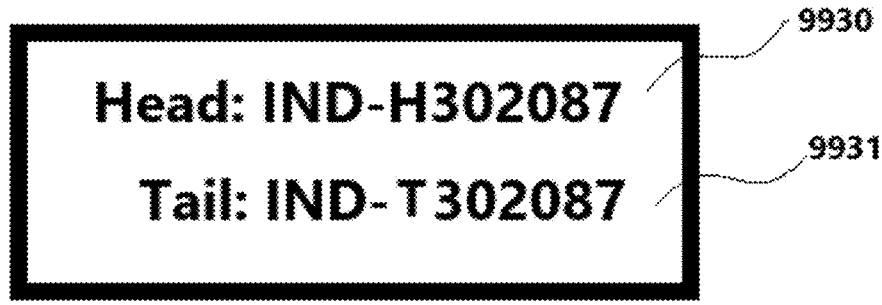
FIG. 4 illustrates a digital license system displaying two same license ids of originally coupled vehicle.
Figure 5:
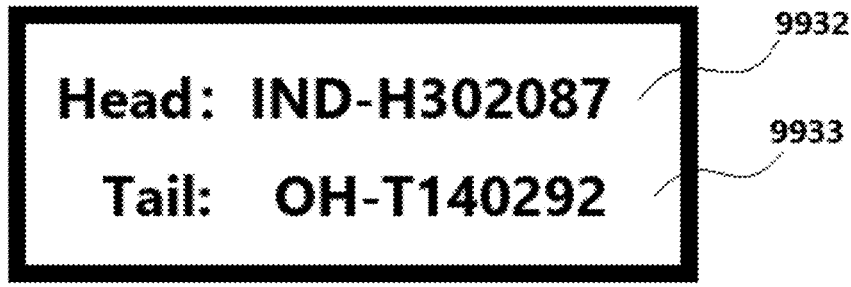
FIG. 5 illustrates another digital license system displaying two different vehicle license ids of temporarily coupled vehicle.

In one embodiment the vehicle command center with interactive digital console screen (FIGS. 1, 2 and 3) 9911 is configured to activate and display information and images 9912 of vehicles coupled and configured with different vehicle modules varying in functions and capacities and models in plurality of data formats. It may display coupled vehicle type 9913; vehicle coupling status 9914; battery power level and vehicle operational range 9915 and 9916, battery power level and the operational range are calculated by vehicle functions and models of the vehicles coupled; odometers of the modules 9917, vehicle driving mode 9918, vehicle modules license identifications 9919, interactive vehicle control functions 9920 etc. The same license IDs may mean the head and the tail are the original coupled vehicle; different license IDs may mean the head and the tail are not the original coupled vehicle, vehicle operation and performance data etc.

d. checking if the braking systems on the driving and non-driving modules are synchronized for distributing the braking power setup for specific modules coupled.
e. activating the independent suspension system's response commands and procedures in response to road conditions designed for vehicle performances and smooth driving experiences required for the specific model and type of the non-driving and driving modules coupled vehicle.
f. adjusting chassis to ground clearance height for a specific type of coupling for vehicle required for operation.
g. activating and adjusting sensor and or camera configured with security systems for the particular modules coupled vehicle.
h. adjusting vehicle signal system for the particular modules coupled vehicle.
i. activating or adjusting sensor and or camera system for monitoring road and surrounding conditions for the particular modules coupled vehicle.
j. consolidating vehicle modules' electric systems into one system to supply electrical power to the entire vehicle as directed by the vehicle operation control system, and with optional one or two charge outlet(s) charge all batteries on both vehicle modules.
k. synchronizing electric power supply resources on both driving and non-driving modules for powering the motors configured to each wheel on the driving and non-driving modules, and other electric equipment.
l. adjusting visual and audio monitoring systems, such as mirrors, video and or camera monitoring systems for the models of the vehicle modules coupled vehicle.
m. a digital license plate system displays vehicle licenses for head and tail (FIGS. 4 and 5). Licenses identifications are entered with an authorization code or a digital key; and the digital license system also sends out wireless signals that licenses may be received and verified by a wireless receiver. Vehicle licenses may be registered and displays separately with vehicle module license identifications for the driving module and the non-driving module configured at the time when the vehicle is coupled and ready to operate, and the license identifications are verified with an authorization code coupled to the vehicle license and entered whenever the coupling and configuration process is taken place. In one scenario vehicle is coupled with its original coupling and configurations and the license displays the same license identifications since the head and the tail are an originally coupled vehicle modules 9930 and 9931, in another scenario the head is temporarily coupled to a tail, and the license plate displays two license identifications 9932 and 9933.

Figure 6:
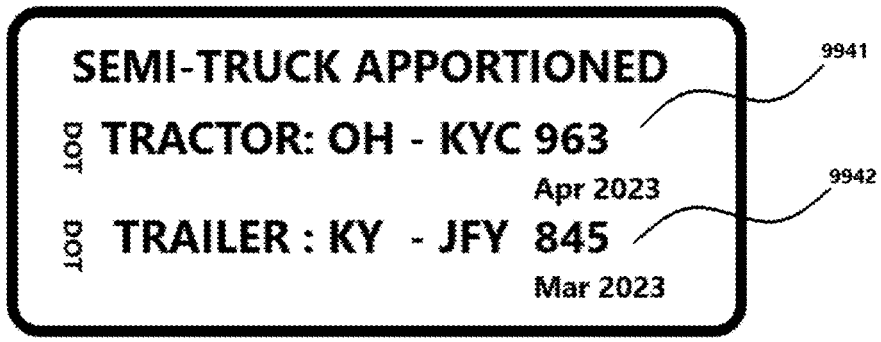
FIG. 6 illustrates a semi-truck apportioned digital license plate.

Though the digital license system is used for two vehicle modules configured to minimum two axle vehicles (each vehicle module has minimum one axle), it may also be applied to semi-trucks—the digital license plate (FIG. 6) displays vehicle licenses of the tractor and tailer separately 9941 and 9942.

The digital license plate may also display other information entered by vehicle user or wirelessly taken over control by automotive authority to display status of the vehicle module(s), such as "License Expired" or "Stolen Vehicle".
  n. activating an anti-hacking software system securely configured with the vehicle control system and prevents malicious attempts and threats from taking over controls of the vehicle control system and the Automated Coupling and Configuration System (ACCS).

Augmented reality algorithm designed in learning and assisting operation of the vehicle is configured with the control systems of the vehicles, and as a part of smart system for driving, parking, and safety measurements. AI (artificial intelligence) algorithms are constantly in the learning process through interactive experience with a real-world environment and vehicle operations: including analyzing individual driver's driving habits, road conditions etc. The algorithms are also constantly enhanced by computer-generated perceptual driving scenarios across plurality of modular vehicle platforms, including visual, auditory, operational data and information received from vehicle performances, and olfactory (for instance detecting consumption of alcohol or use of controlled substances by driver and or passengers). These functions are particularly important for the modular vehicle system since vehicle functions, sizes, weight, and safety measurements vary depending on specific configuration and couplings of vehicle modules.

Data collected by an onboard AI system, such as a driver's driving habits, frequent routings, road condition, past experiences of driving with different non-driving modules may be transferred securely and wirelessly to another vehicle control system of a driving module when the driver buys, rents, switches his driving module with another owner of driving module.

What has been described above includes examples of the present specification. It is opacifications possible to describe every conceivable combination of components or methodologies for purposes of describing the present specification, but one of ordinary skill in the art may recognize that many further combinations and permutations of the present specification are possible. Each of the components described above may be combined or added together in any permutation to define the described systems. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although the embodiments of the present technology have been illustrated in the accompanying drawings and described in the foregoing detailed description, it is to be understood that the present technology is not to be limited to just the embodiments disclosed, but that the technology described herein is capable of numerous rearrangements, modifications, and substitutions without departing from the scope of claims hereafter. Drawings accompanied with the illustrations are for the sole purpose of demonstrating the inventive concepts only and are not drawn in scales and ratio. The claims as follows are intended to include all modifications and alterations insofar as they come within the scope of the claims or the equivalent thereof.

The invention claimed is:

1. A dynamic and transformative vehicle system including:
  a driving module having at least one axle and a non-driving module having at least one axle,
  a processor in the non-driving module;
  a vehicle operation control system in the driving module comprising:
    an interactive digital console screen;
    a graphical user interface (GUI) module:
    a processor in the driving module; and
    a memory including processor-readable instructions, when executed by the processor in driving module, causes the processor in driving module to:
    receive an indication that a coupling and configuration process between the driving module and the non-driving module is complete,
    perform a first verification operation to verify proper connections between the driving module and the non-driving module,
    perform a second verification operation to verify a locking mechanism connecting the driving module and non-driving module is locked, and
    transmit information indicating the first verification operation and the second verification operation are complete to a graphical user interface (GUI) module of the vehicle operation control system in the driving module;
    receive identification and status information from the non-driving module,
    generate a representative image of a coupled vehicle including the driving module coupled to the non-driving module,
    transmit information representative of:
      the representative image,
      an estimated battery status, and
      an estimated driving range to the GUI module for display on the console screen, and
    display interactive vehicle operation control functions referencing the representative image on the interactive digital console screen.

2. The vehicle system of claim 1, further comprising instructions operative to cause the processor in the driving module to initiate an autopilot function and a full self-driving (FSD) function.

3. The vehicle system of claim 1, further comprising instructions operative to cause the processor to synchronize a braking system on the driving module and a braking system on the non-driving module in order to distribute braking power.

4. The vehicle system of claim 1, further comprising instructions operative to:
  cause the processor in the driving module to activate procedures configured for specific vehicle models;
  send commands to an independent suspension system on the driving module and an independent suspension system on the non-driving module in response to road conditions.

5. The vehicle system of claim 1, further comprising instructions operative to cause the processor in the driving module to adjust a chassis of the coupled vehicle to ground clearance height.

6. The vehicle system of claim 1, further comprising instructions operative to cause the processor in the driving module to activate and adjust a sensor and/or a camera of the coupled vehicle.

7. The vehicle system of claim 1, further comprising instructions operative to cause the processor in the driving module to adjust a vehicle signaling system.

8. The vehicle system of claim 1, further comprising instructions operative to cause the processor in the driving module to activate and adjust sensor and/or camera system of the coupled vehicle for monitoring road and surrounding conditions.

9. The vehicle system of claim 1, further comprising instructions operative to cause the processor in the driving module to consolidate an electric power supply resource on the driving module and an electric power supply resource on the non-driving module,
wherein the electric power supply resource powers a motor of each wheel on the at least one axle of the driving module and each wheel on the at least one axle of the non-driving module.

10. The vehicle system of claim 1, further comprising instructions operative to cause the processor to activate an anti-hacking software to prevent malicious attempts and threats from taking over controls of the vehicle system.

11. The vehicle system of claim 1, further comprising instructions operative to cause the processor in the driving module to:
determine a vehicle model of the coupled vehicle; and
transmit information representative of the vehicle model to the GUI module for display on the console screen.

12. The vehicle system of claim 1, further comprising instructions operative to cause the processor in the driving module to:
identify a plurality of available driving modes associated with the coupled vehicle;
identify a current driving mode from said plurality of available driving modes; and
transmit information representative of the current driving mode and available driving modes to the GUI module for display on the console screen.

13. The vehicle system of claim 1,
wherein the identification and status information include odometer information for the driving module and odometer information for the non-driving module, and further comprising instructions operative to cause the processor in the driving module to:
transmit information representative of said odometer information to the GUI module for display on the console screen.

14. The vehicle system of claim 1,
wherein the identification and status information include vehicle license plate information for the driving module and vehicle license plate information non-driving module, and further comprising instructions operative to cause the processor in the driving module to:
transmit information representative of the vehicle license plate information for both the driving module and the non-driving module to the GUI module for display on the console screen.

* * * * *